Figure 1:
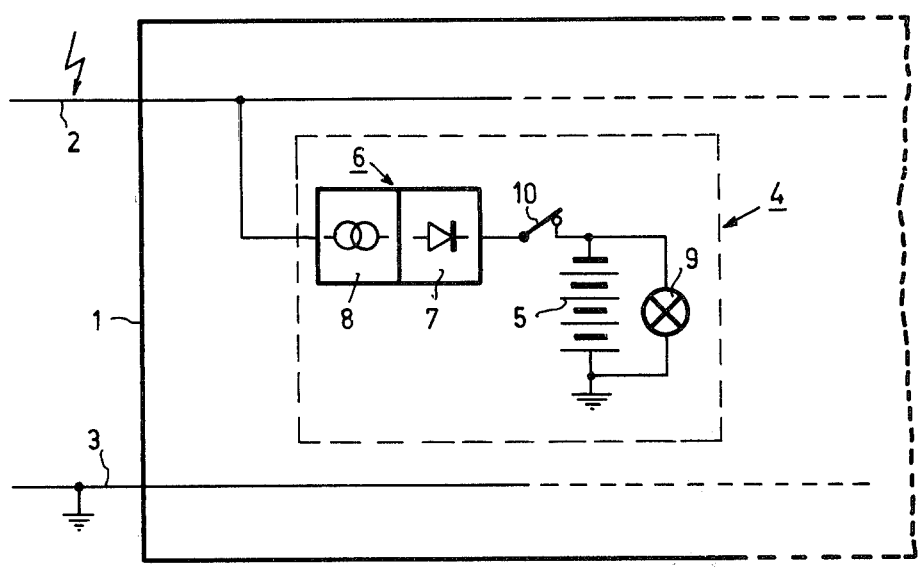

United States Patent [19]
Prochazka et al.

[11] 3,916,212
[45] Oct. 28, 1975

[54] EMERGENCY LIGHTING SYSTEM FOR A TUNNEL

[75] Inventors: Herbert Prochazka; Erich Irk, both of Vienna, Austria

[73] Assignee: U.S. Philips Corporation, New York, N.Y.

[22] Filed: Feb. 8, 1974

[21] Appl. No.: 440,715

[30] Foreign Application Priority Data
Feb. 19, 1973 Austria .............................. 1450/73

[52] U.S. Cl. ................................................ 307/66
[51] Int. Cl.² ............................................. H02J 7/00
[58] Field of Search ............................. 307/66, 64

[56] References Cited
UNITED STATES PATENTS

| | | | |
|---|---|---|---|
| 1,756,589 | 4/1930 | Gilson | 307/66 |
| 1,882,472 | 10/1932 | Beetem | 307/66 |
| 1,908,985 | 5/1933 | Kennedy | 307/66 |

*Primary Examiner*—Herman Hohauser
*Attorney, Agent, or Firm*—Frank R. Trifari; Bernard Franzblau

[57] ABSTRACT

Emergency lighting system for a tunnel having at least one contact wire overhead conductor for the current supply of a train.

According to the invention the emerging lighting system is provided with a battery which is connected to the contact wire and is charged through this contact wire; whereby in the case that the contact voltage drops out — for example by a railway accident in the tunnel — an emergency light source is connected to the battery.

12 Claims, 3 Drawing Figures

EMERGENCY LIGHTING SYSTEM FOR A TUNNEL

The invention relates to an emergency lighting system for a tunnel having at least one contact wire for the current supply of vehicles. The contact wire is in general an overhead conductor which makes contact with the current strip of the pantograph of the vehicle.

An emergency lighting system of this kind may be constructed in such a manner that a conventional emergency lighting system is installed in the tunnel which is fed by a conventional AC supply voltage of, for example, 220 Volt. In such a system there are, however, various difficulties. When the tunnel concerned is in an uninhabited and perhaps inhospitable area, the supply voltage must first be fed to the tunnel which — as is understandable — involves many troubles and costs. In addition the supply voltage line would have to be specially protected, for example, by a construction such as an armoured cable so that the line cannot be damaged by exterior influences.

An object of the invention is to provide a very simple and especially reliable emergency lighting system for a tunnel which, tunnel has at least one contact wire for the current supply of vehicles.

According to the invention this is achieved in that in the tunnel at least one charge installation for at least one battery is connnected to the contact wire, the battery being present for the supply — optionally being effected through a voltage converter — of at least one light source installed in the tunnel.

The invention is based on the special insight that a battery-fed emergency lighting system of this kind which is independent of external influences be maintained continuously ready for operation by the contact wire voltage already present in the tunnel. The emergency lighting system may then be either permanently operative or manually or remotely switched on at any time. In addition it can be ensured that the battery together with the light source provide emergency lighting for the tunnel as soon as the contact wire voltage drops out. A short circuit of the contact wire does not result in the extinction of the emergency lighting if the charge installation does not permit the supply of current from the battery to the contact wire.

In a preferred embodiment of an emergency lighting system according to the invention a voltage supervision device is connected to the charge current circuit for the battery, which device closes the generally open current circuit from the battery to the light source when the contact wire voltage drops out.

An advantage of this preferred embodiment is that the emergency lighting system is not continuously operative; it is only switched on automatically when the contact wire voltage drops out. As a result unnecessary use of the light tunnel sources is avoided. The charge device need only supply enough current so that the battery remains charged.

The said preferred embodiment may be further improved by adding a separate switching device for closing the current circuit from the battery to the light source when the contact wire voltage is present.

This improvement makes it possible to switch on the emergency lighting system at any time even when the contact wire voltage is present. This step also provides inter alia the possibility to test the system.

In a further improvement of the said preferred embodiment according to the invention in which various batteries and light sources are installed in the tunnel, a common switching device is present for switching on the total emergency lighting system in the tunnel when the contact wire voltage is present. This switching device can then preferably be operated from both ends of the tunnel. As a result the tunnel may be temporarily lighted when it is inspected, while simultaneously the satisfactory operation of the system can be tested.

In a further preferred embodiment of a device according to the invention the switching device can be remotely switched on, preferably by vehicles passing through the tunnel.

In this manner the emergency lighting system may be directly switched on either from a place far remote from the tunnel or from a vehicle which is outside or somewhere in the tunnel. Consequently, the emergency lighting systems can also be switched on when a vehicle enters the tunnel, and switched off when it leaves the tunnel again without having to stop. This may be effected by any vehicle using the tunnel but also only in exceptional cases, for example, when the driver of the vehicle must check the operation of the system.

In an advantageous embodiment according to the invention the switching device is provided with an apparatus which can be remotely controlled by a vehicle passing through the tunnel and which switches on the emergency lighting system as soon as the vehicle remains in a section of the tunnel for a period exceeding a fixed time.

An advantage thereof is that the emergency lighting system is switched on automatically under any circumstances as soon as a vehicle comes to a standstill in the tunnel and independent of the fact whether the contact wire voltage has dropped out or is still present.

The invention will be described in detail with reference to the accompanying drawing diagrammatically showing some embodiments of emergency lighting systems according to the invention in which FIG. 1 shows an emergency lighting system permanently operating.

Figure 2:
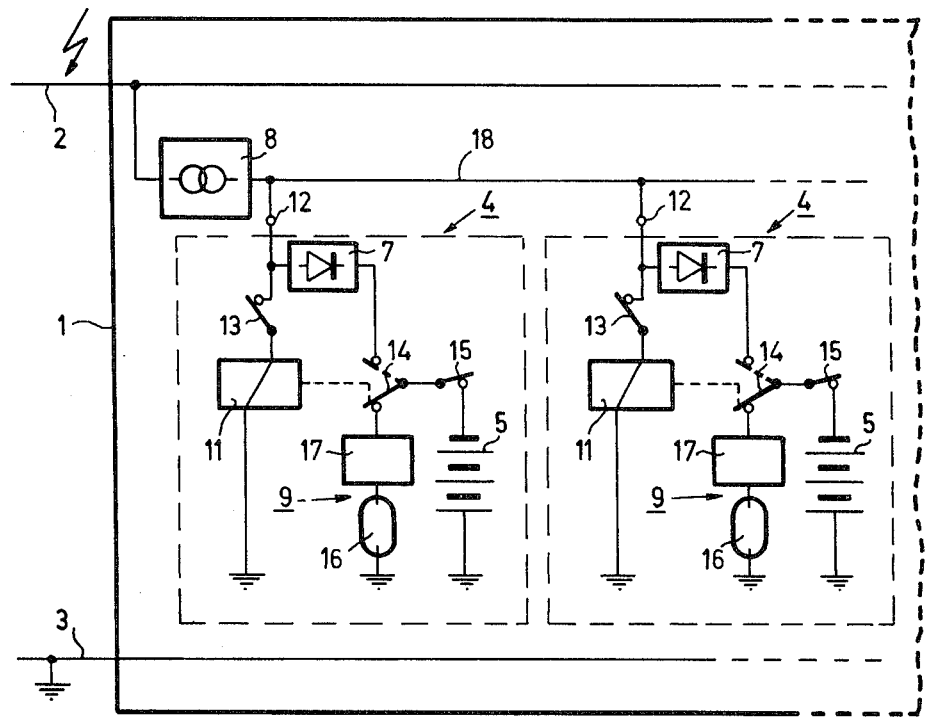

FIG. 2 diagrammatically shows an emergency lighting system which is switched on when the contact wire voltage drops out.

Figure 3:
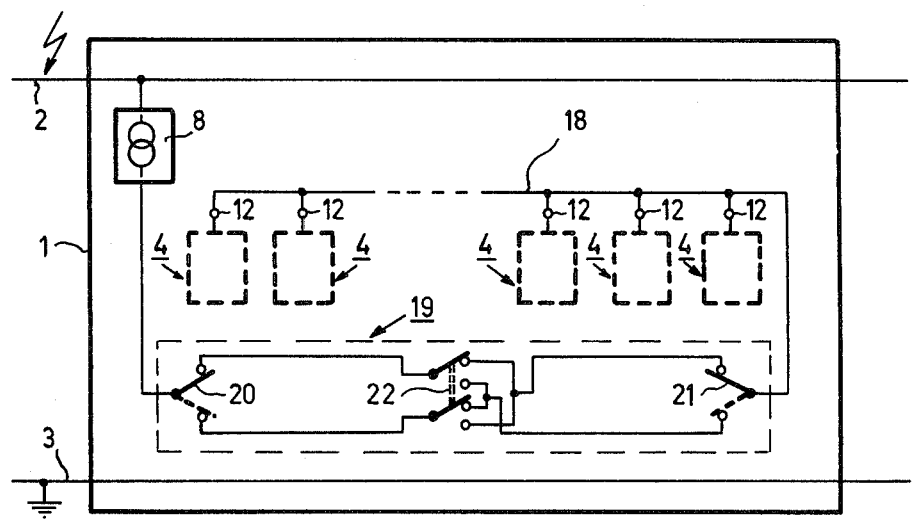

FIG. 3 shows a modification of the embodiment of FIG. 2 in which a switching device is present with which the total emergency lighting system in the tunnel can be switched on when the contact wire voltage is present.

In FIG. 1 the reference numeral 1 diagrammatically shows a tunnel in which a contact wire 2 is present. The contact wire 2 is connected to a high-voltage alternating current source not shown. Contact wire 2 serves to supply current to a vehicle moving on rails 3 (vehicle is not shown). The tunnel 1 is, for example, a railway tunnel in an isolated area. Emergency lighting units 4 are provided, as desired, at different places in the tunnel and one of the units is shown in FIG. 1. Such an emergency lighting unit has a battery 5 which is connected through a charge device 6 to the contact wire 2. The battery having a voltage of 12 V may consist of, for example, 10 series-arranged, maintenance-free, gastight nickel-cadmium cells. The charge device 6 consists of a rectifier installation 7 preceded by a voltage converter 8. The converter 8 serves to transform the high contact wire voltage to a lower value. A light source 9 is connected to the battery 5. The light source may be, for example, an incandescent lamp. However, due to the higher efficiency, the longer lifetime and the greater insensitivity to vibrations, low-pressure mercury vapour discharge lamps are preferably used. It is feasible that two or more light sources may be connected to the battery.

In the case of FIG. 1 the emergency lighting system is constantly operating. The contact wire voltage provides the light source 9 with current through the charge device 6. Simultaneously the charge device also feeds the battery 5 so that it is always charged. When for some reason or other the contact wire voltage drops out, for example, due to an accident in the tunnel resulting in breakage of the contact wire, the battery 5 takes over to supply energy to the light source 9. The charge device 6 ensures an electrical separation of battery and light source from the contact wire so that possible short circuits of the contact wire do not have any influence on the current circuit of the battery and light source.

It is advantageous that the battery, the light source and at least the rectifier installation of the charge device constitute a compact structural unit so that possible accidents in the tunnel have a minimum influence on the battery-light source current circuit. Therefore it is preferred to have a separate rectifier installation for each battery. This is of course not absolutely necessary because, for example, one rectifier installation can feed two batteries and light sources which are spatially not too far apart from each other when the precaution is taken that the leads leaving the charge device are formed in such a manner that they cannot be damaged. Generally it is possible to provide a common voltage converter for all emergency lighting units in the tunnel because its output lead need not be safeguarded against damage.

An emergency lighting system as described above is permanently switched on and in emergencies it is thus independent of switch-on processes. A further advantage of the described emergency lighting system is that the operation of the light sources 9 can be continuously checked because they must operate continuously. An absolute guarantee for the operation of the battery is however not given. To check this a switch 10 is provided between the charge device 6 and the battery 5 with which switch the current circuit from the charge device to the battery and the light source can be interrupted whereafter a good battery ensures that the light source 9 is still operative.

In the embodiment of FIG. 2 an emergency lighting unit 4 consists of a rectifier installation 7, battery 5, light source 9 and a voltage supervision device 11. The voltage supervision device 11 is connected to the input terminal 12 of the emergency lighting unit through a switch 13 and in turn operates a change-over switch 14. Furthermore the rectifier installation 7 is connected to the input terminal 12 and its output is connected to a contact of the change-over switch 14. The battery 5 is connected through a further switch 15 to the base of the change-over switch 14. The light source 9 is connected to the other contact of the change-over switch 14 and the light source consists in this case of a low-pressure mercury vapour discharge lamp 16 and a voltage converter 17 which converts the battery voltage into an alternating voltage having a larger amplitude and a higher frequency.

The input terminals 12 of all emergency lighting units 4 are connected to a lead 18 which is connected to a voltage converter 8 which is in turn connected to the contact wire 2. In this manner only one voltage converter 8 feeds all emergency lighting units 4 present in the tunnel.

When a sufficiently high voltage is present across the input terminal 12 of an emergency lighting unit, the voltage supervision device 11, formed as a relay, is energized and the change-over switch 14 is in the position denoted by the broken lines in FIG. 2. As a result the current circuit from input terminal 12 through the rectifier installation 7, the change-over switch 14 and the switch 15 to the battery 5 is closed. The rectifier installation 7 is preferably formed in such a manner that overcharging of the battery is impossible. When the voltage at the input terminal 12 decreases below an adjusted value, the relay 11 drops out so that the change-over switch 14 moves to the position shown by solid lines in FIG. 2 and opens the circuit from the battery to the rectifier installation. The current circuit from the battery through the switch 15, the change-over switch 14, the voltage converter 17 to the low-pressure mercury vapour discharge lamp 16 is then closed so that the light source 9 will operate. This is the on condition of the emergency lighting apparatus. Such a case occurs when the contact wire voltage drops out because then the lead 18 no longer conveys any voltage. Special steps to safeguard the voltage converter 8 and the lead 18 against possible destruction are not necessary because such a destruction would result in the emergency lighting system being switched on.

An advantage of the system of FIG. 2 is that the light sources 9 are not continuously switched on so that no unnecessary wear occurs.

The switch 13 represents a separate switching device with which the current circuit from the battery 5 to the light source 9 can be closed when the contact wire voltage is present. In fact when the switch 13 is opened, the relay 11 drops out and connects the light source 9 to the battery 5 through its change-over switch 14. In this manner the emergency lighting unit can be switched on when the contact wire voltage is present so that its operation can be checked.

The switch 15 serves for switching off the emergency lighting system which may be necessary, for example, when the contact wire 2 is deliberately not carrying a voltage for a longer period. When the switch 15 is opened, the battery current circuit is interrupted so that even though the relay 11 has dropped out, the light source 9 is not provided with any current. In this manner an unwanted discharge of the battery is prevented.

FIG. 3 shows an extension of the emergency lighting system shown in FIG. 2. FIG. 3 shows that for all emergency lighting units 4 provided in the tunnel a common switching device 19 is present for switching on the total emergency lighting system in the tunnel when the contact wire voltage is present. The operation of this switching device 19 is based on the fact that for switching on the emergency lighting system when the contact wire voltage is present, the connection between the voltage converter 8 and the lead 18 is interrupted which results in the emergency lighting system being switched on. The switching device 19 therefore has change-over switches 20 and 21 at each opening of the tunnel and in between it has an arbitrarily large number of dual switches 22 arranged along the entire tunnel path. One of these switches is shown in FIG. 3. The contacts of the change-over switches are mutually connected in the known manner of a hotel switch system so that switching on and switching off can be effected with any switch and switching on can be effected with an arbitrary switch while switching off can be effected with another arbitrary switch. The base of the change-over switch 20 is connected to the voltage converter 8 and that of the change-over switch 21 is connected to the lead 18. In this manner the emergency lighting system can be switched on or off at arbitrarily many places in the tunnel. A safeguard of the switching device against destruction is not necessary because an interruption or a short circuit in the leads automatically results in the emergency lighting system being switched on.

The switches 20, 21, and 22 may be operated manually and/or remotely. The remote operation has a great number of possibilities for ensuring the reliability of such an emergency lighting system. Remote operation may be effected in different ways, for example, photoelectrically, electromagnetically or radiographically. This is not further shown in FIG. 3 because steps generally known to those skilled in the art are concerned in this case. A remotely controlled emergency lighting system may be switched on by a vehicle entering the tunnel and switched off again when the vehicle leaves the tunnel. To this end the change-over switches 20 and 21 must be operated accordingly. When it is desired that the emergency lighting system does not operate when a vehicle passes through the tunnel without any hindrance, the switching device may be provided with an apparatus which can be remotely controlled by a vehicle using the tunnel and which switches on the emergency lighting system as soon as the vehicle is present in section of the tunnel for a period of time which is longer than predetermined fixed time.

Remote operation may of course also be provided for the embodiment of FIG. 2, for the switches 13 and if necessary in an analogous manner for the switches 15.

Of course other modifications deviating from the above-mentioned embodiments are feasible. This applies especially for the switching technical structure of an emergency lighting unit 4. For example, the change-over switch 14 can be omitted and the light source 9 may be connected to the charge-current circuit of the battery 5 by a simple switch controlled by the voltage supervision device 11 while the light source is likewise fed by the charge device when the contact wire voltage is present and the emergency lighting unit is switched on. Of course the emergency lighting system according to the invention may alternatively be used in tunnels for vehicles with two contact wires not riding on rails.

What is claimed is:

1. An emergency lighting system for a tunnel comprising at least one contact wire for the current supply of vehicles passing through the tunnel, an electric battery, at least one electric charge current device connected to the contact wire in the tunnel for supplying electric charge to the battery, and means connecting the battery to at least one light source arranged in the tunnel for energizing said light source.

2. An emergency lighting system as claimed in claim 1 further comprising a voltage supervision device responsive to the contact wire voltage and connected to the charge current device for the battery, and wherein said battery connecting means includes a generally open current circuit between the battery and the light source, said supervision device being operative to close the generally open current circuit from the battery to the light source when the contact wire voltage drops out.

3. An emergency lighting system as claimed in claim 2 further comprising a separate switching device available for closing the current circuit from the battery to the light source when the contact wire voltage is present.

4. An emergency lighting system as claimed in claim 2 in which various batteries and light sources are arranged in the tunnel and further comprising a common switching device for switching on the entire emergency lighting system in the tunnel when the contact wire voltage is present.

5. An emergency lighting system as claimed in claim 4, wherein the common switching device can be operated at least from both tunnel openings.

6. An emergency lighting system as claimed in claim 4 wherein the switching device is remotely controlled preferably by vehicles passing through the tunnel.

7. An emergency lighting system as claimed in claim 6, wherein the common switching device includes an apparatus remotely controlled by a vehicle passing through the tunnel which switches on the emergency lighting system as soon as said vehicle remains in a section of the tunnel for a time period which is longer than a predetermined fixed time.

8. A railway emergency lighting system comprising at least one light source located along a railway track, a contact wire for supplying electric current to vehicles passing along the track, a storage battery, an electric charge device connected between the contact wire and the battery for supplying electric charge to the battery from the contact wire, and circuit means connecting the battery to said light source whereby the light source is energized by the battery if the voltage on the contact wire drops below a given level.

9. An emergency lighting system as claimed in claim 8 wherein said circuit means includes a switching device having a first position which maintains the connection between the battery and light source open and a second position that closes said connection, and means responsive to the contact wire voltage for selectively operating said switching device between said first and second positions as a function of the amplitude of the contact wire voltage.

10. An emergency lighting system as claimed in claim 9 further comprising a second switching device for selectively connecting said switching device operating means to the contact wire so that operation of the second switching device to the open position deenergizes the switching device operating means which in turn operates the first switching device to the second position.

11. An emergency lighting system as claimed in claim 8 wherein said circuit means provides a direct connection between the battery and light source is continuously connected to the battery for all levels of the contact wire voltage.

12. An emergency lighting system as claimed in claim 8 wherein said circuit means includes a switching device having a first position which maintains the connection between the battery and light source open while simultaneously maintaining the connection between the electric charge device and the battery closed and a second position that closes the connection between the battery and light source while simultaneously opening the connection between the electric charge device and the battery, and means responsive to the contact wire voltage for selectively operating said switching device between said first and second positions as a function of the contact wire voltage.

* * * * *